Figure 1:
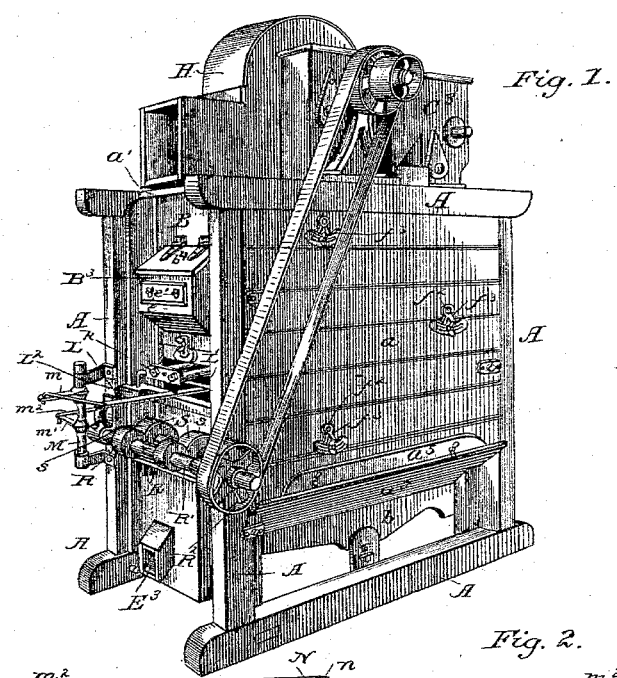

(No Model.) 4 Sheets—Sheet 1.

J. T. WALTER.
MIDDLINGS PURIFIER.

No. 290,504. Patented Dec. 18, 1883.

Witnesses.
Jno. W. Stockett.
C. C. Poole

Inventor.
John T. Walter
per U.S. Dayton
Attorney

N. PETERS. Photo-Lithographer, Washington, D. C.

(No Model.) 4 Sheets—Sheet 2.

J. T. WALTER.
MIDDLINGS PURIFIER.

No. 290,504. Patented Dec. 18, 1883.

Witnesses:
Jno. W. Stockett.
C. C. Poole.

Inventor:
John T. Walter (No Model.) 4 Sheets—Sheet 3.

J. T. WALTER.
MIDDLINGS PURIFIER.

No. 290,504. Patented Dec. 18, 1883.

Witnesses.
Jno. W. Stockett.
C. C. Poole

Inventor:
John T. Walter
per W. E. Dayton
Attorney.

(No Model.) 4 Sheets—Sheet 4.

J. T. WALTER.
MIDDLINGS PURIFIER.

No. 290,504. Patented Dec. 18, 1883.

Witnesses:
Jno. W. Stockett
C. C. Poole

Inventor:
John T. Walter
per M. E. Dayton
Attorney

UNITED STATES PATENT OFFICE.

JOHN T. WALTER, OF EASTON, PENNSYLVANIA.

MIDDLINGS-PURIFIER.

SPECIFICATION forming part of Letters Patent No. 290,504, dated December 18, 1883.

Application filed April 20, 1883. (No model.)

*To all whom it may concern:*

Be it known that I, JOHN T. WALTER, of Easton, in the State of Pennsylvania, have invented certain new and useful Improvements in Middlings-Purifiers; and I do hereby declare that the following is a full, clear, and exact description thereof, reference being had to the accompanying drawings, and to the letters of reference marked thereon, which form a part of this specification.

This invention relates to that class of separators known as "middlings-purifiers," which comprise a housing, one or more inclined vibrating screens contained therein, and means for inducing an air-current through the screens.

One object of this invention is to provide means in such a machine for separating the coarser particles from the dust that is taken up by the air-blast.

Another object is to provide means in a machine having two or more oppositely-inclined screens arranged so that the tailings from one screen are delivered to the head of the screen below for removing the larger and lighter specks or impurities from the tailings of each screen, so as to prevent such impurities from passing to the succeeding screen of the series.

Other objects of the invention are to provide an improved means for separating the material passing through the different portions of a screen, to provide an improved device for operating the rotary beaters which clear the bolting-cloth, and to improve the details of construction in the class of machines referred to in other particulars.

To these ends the invention consists in the matters hereinafter described, and pointed out in the claims.

The invention is illustrated in the drawings in connection with a machine having three oppositely-inclined screens, graduated in fineness, the coarser ones being at the bottom, which are arranged in such a manner that the tailings of the upper screen pass to the screen below it, and the tailings from the latter screen to the lower one, from which they pass out of the machine. The screens mentioned are placed in a frame or casing, which is vibrated so as to give a suitable shaking motion to the several screens, and which casing is divided by means of partitions placed between each of the screens into separate chambers, each of which is connected at a point above the screens therein with a suitable exhaust-fan. The said casing is supported in a suitable frame, upon which the other operative parts of the machine are mounted, as will be hereinafter more fully described.

Figure 2:
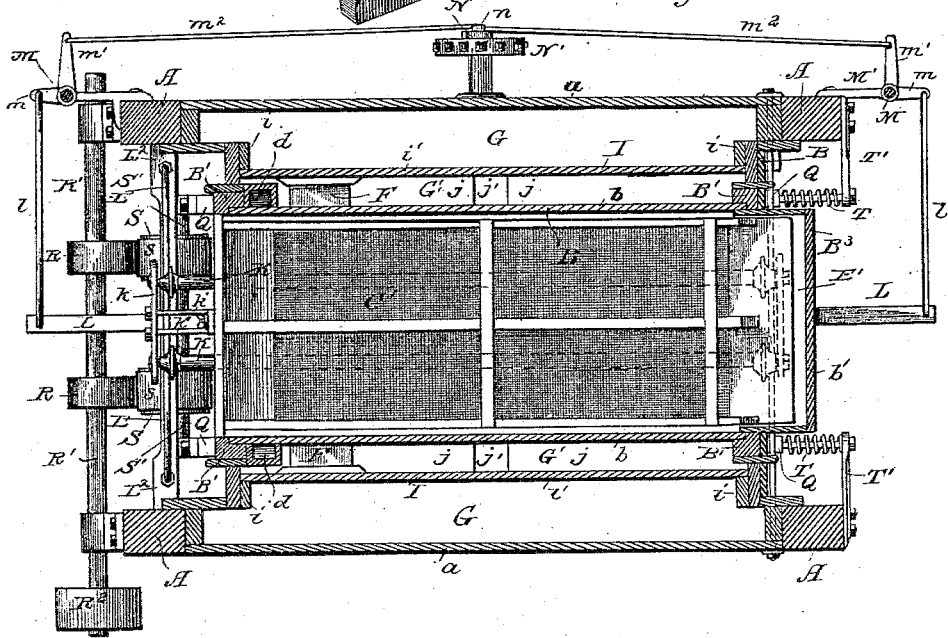
Figure 3:
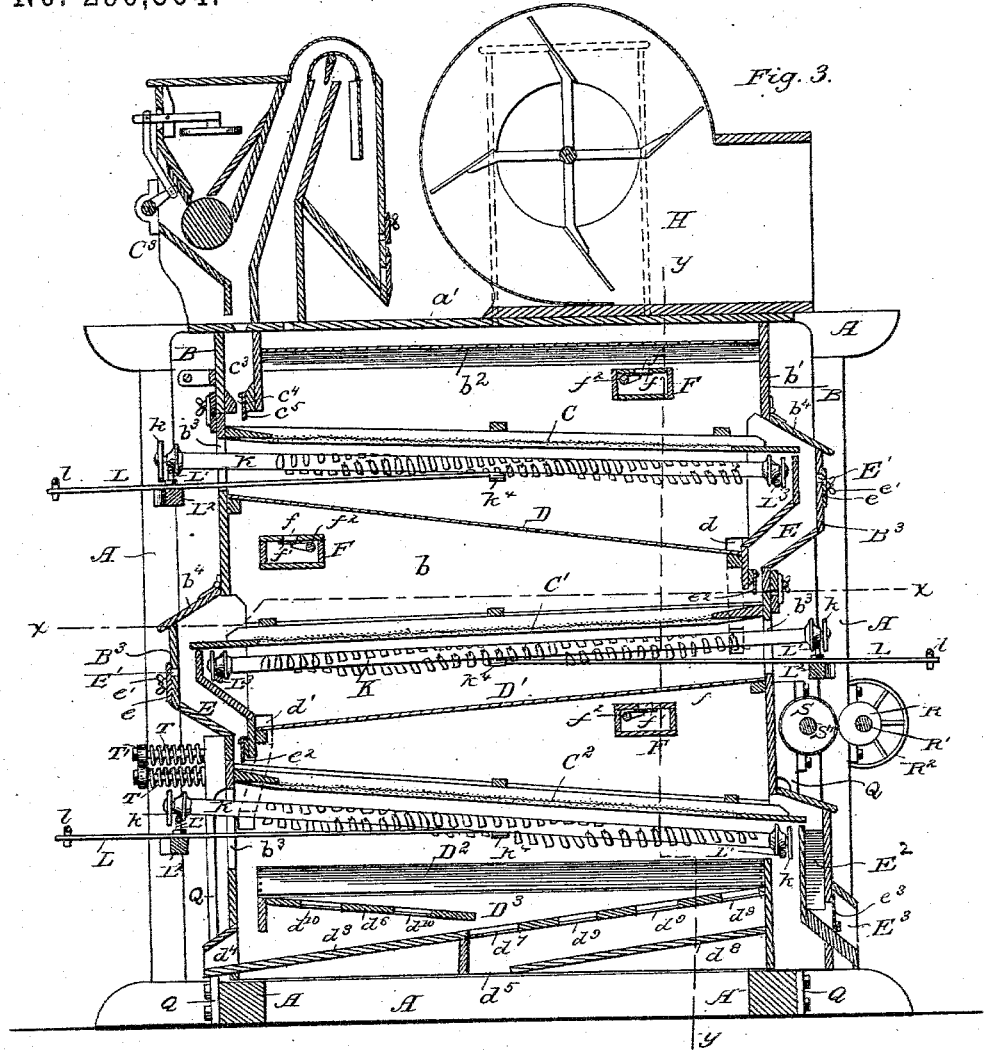
Figure 8:
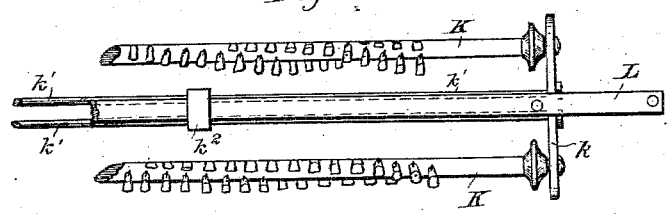
Figure 9:
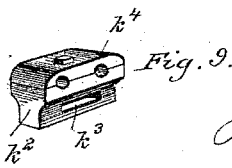
Figure 4:
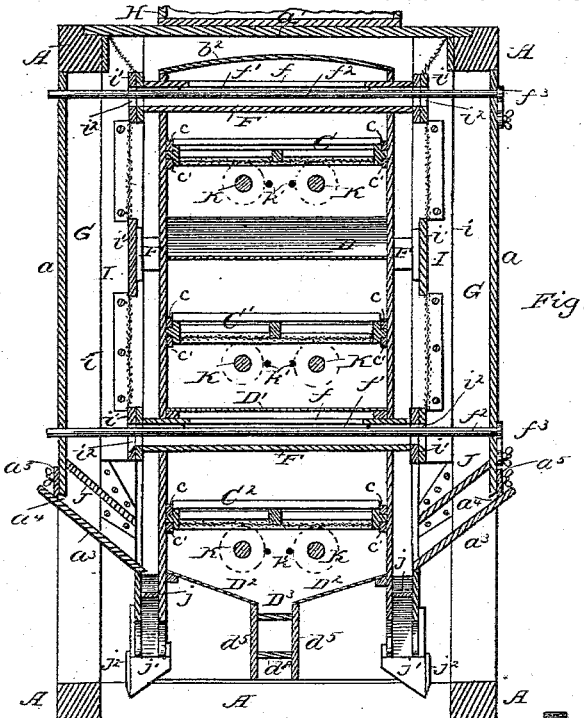
Figure 5:
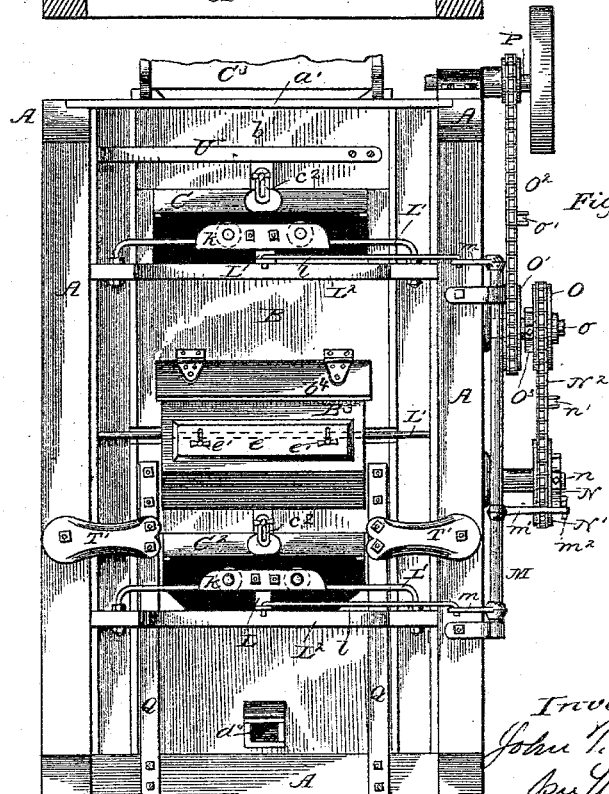
Figure 6:
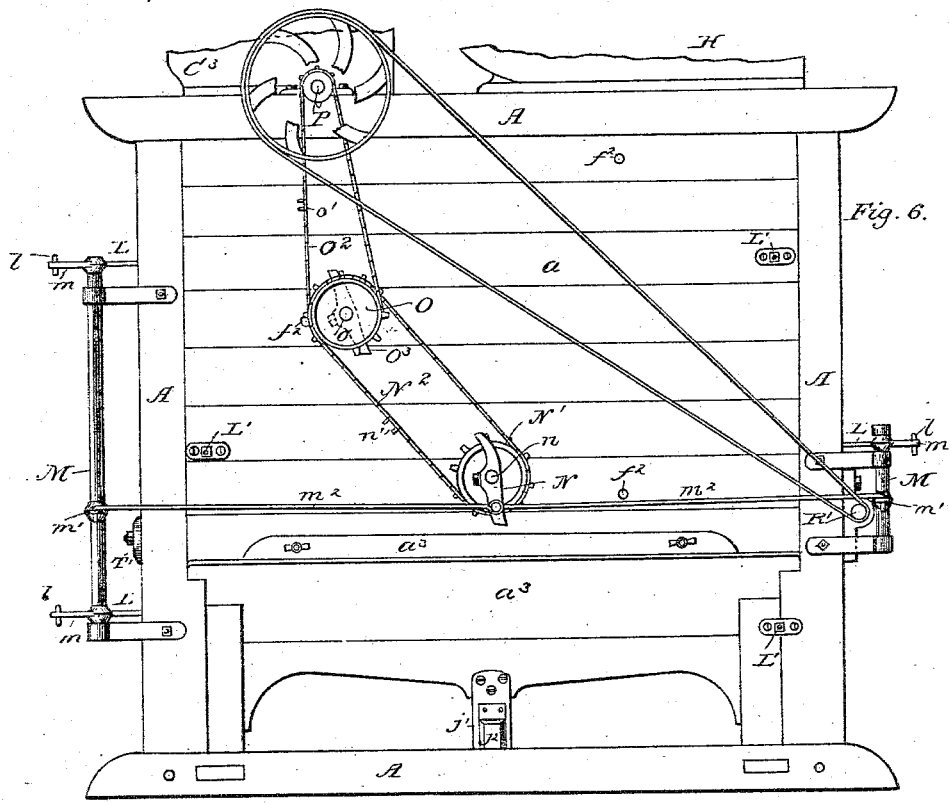
Figure 7:
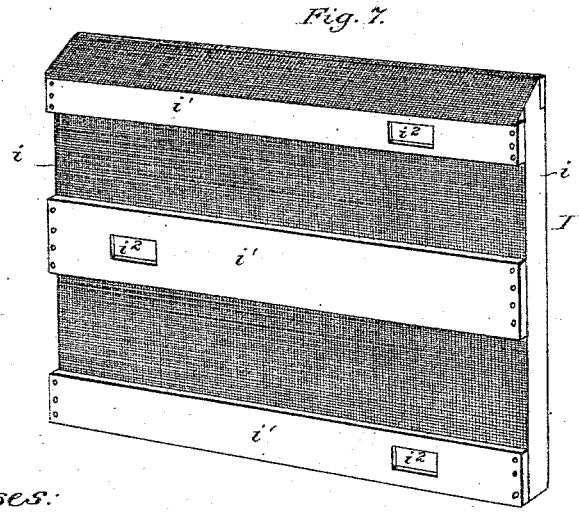

In the accompanying drawings, Figure 1 is a perspective view of a middlings-purifier embodying my invention. Fig. 2 is a horizontal section on line $x\ x$ of Fig. 3. Fig. 3 is a central vertical section of the same. Fig. 4 is a transverse vertical section on line $y\ y$ of Fig. 3. Fig. 5 is an end elevation of the same. Fig. 6 is a side elevation of the same. Fig. 7 is a detail view of the muslin partition in the air-chamber and its frame removed from the machine. Fig. 8 is a detail view of the lever for operating the rotary cloth-cleaners and its means of attachment thereto. Fig. 9 is a separate view of the block for connecting the lever with the cloth-cleaner.

A is the rectangular frame of the machine upon which the several operative parts are mounted, and B is an inner frame or casing in which the screens are supported. The casing B is reciprocated by means hereinafter described, for the purpose of giving the necessary shaking movement to said screens.

C, C', and $C^2$ are three screens, which are inclined in opposite directions and so arranged that the material passing over the lower end of one screen is received at the head of the one below it. The said screens are graduated in fineness, the one allowing the passage of the finest particles being placed at the top of the machine.

$C^3$ is a self-regulating separating-feeder, which is placed over the head of the screen C, and is constructed to deliver the material thereto in a thin stream the full width of the screen. Said feeder is to be the subject of a separate application for a patent, and forms no part of the present invention.

The casing B is composed of corner frame-pieces B', side walls, $b$, end walls, $b'$, and a closed top or roof, $b^2$, and its interior is divided into three compartments by means of inclined partitions D D' placed intermediately of the screens, and upon which the material passing through the screens is received, such material being the purified middlings. The partitions D and D' are connected by vertical passages $d$, which conduct the material from the lower end of the partition D around the screen C to the partition D', and similar passages, $d'$, extend from the lower end of the partition D' to the space beneath the lower screen, $C^2$, whereby the material from the said partition D' is delivered to a spout placed beneath said screen, by which it is discharged to the outside of the machine, as will hereinafter be described. The tailings from the screens C C' pass to the head of the screens below them, and around the ends of the partitions D D', through passages E, as shown, and the tailings from the lower screen, $D^2$, pass to a trough, $E^2$, having its bottom inclined to a central spout, $E^3$, through which said tailings are discharged from the machine.

Upon either side of the casing B, and occupying the space between the end parts of the frame of the machine, I have placed air-chambers G, which communicate with the interior of the compartments in the casing B above each of the screens, by means of air-trunks F, and are connected by suitable passages with an exhaust-fan, H, placed upon the top of the machine. By means of said exhaust-fan an upward air-blast is maintained through the screens for separating the dust and finer impurities from the middlings. The air enters the casing B through openings $b^3$ in the end walls, $b'$, of the said casing, and below the screens, and passes outward through the trunks F and chambers G to the exhaust-fan. The trunks F are supported in the side walls, $b$, of the casing B, and their open ends project a short distance into the chambers G, for a purpose hereinafter set forth. The said trunks are provided with inlet-openings $f$, preferably placed in their top surface, through which openings the air from the interior of said casing is drawn.

In order to regulate the air-current through the several screens, the openings $f$ are provided with valves $f'$, the shafts $f^2$ of which valves extend outwardly through the chambers G to the exterior of the machine, and are provided with means for holding the valves in any desired position, consisting, as shown, of slotted segmental arms $f^3$ and thumb-screws $f^4$ passing through the slots in said arms for securing them to the side walls of the machine. The outer walls of the chambers G are formed by a casing, $a$, placed between the vertical end posts, A', of the frame, and the inner walls thereof by the side walls, $b$, of the casing B, a close-fitting sliding joint being formed between the frame-pieces B' at each corner of the casing B and the inwardly-projecting pieces $a^2$, which form the ends of the chambers G, so as to allow the reciprocation of the said casing B, and at the same time prevent the entrance of air to said chambers. The bottoms of the chambers G consist of inclined pieces. $a^3$, the lower and inner ends of which are in contact with and slide upon longitudinal side pieces, $b^4$, which are placed parallel with and outside of the side walls, $b$, at the lower margin thereof. A close covering, $a'$, is placed over the top of the frame A, and the end walls, $b^2$, of the casing B, extend upwardly to said covering and form a close joint therewith, as shown in Fig. 3, thus forming a closed space, G', over the casing B, which space communicates at either side with the chambers G. The exhaust-fan H is placed upon the covering $a'$, and its inlet is connected with the space G' by means of vertical passages $h$, as shown. The chambers G are for the purpose of accomplishing a separation of the coarser particles contained in the dust drawn by the air-current from the interior of the casing B, the said chambers being of sufficient size to cause a reduced movement of the air therein and allow a settlement of the larger and heavier particles to the bottom of said chambers.

To insure a more complete separation of the larger particles from the dust, a vertical partition, I, is placed in each of the chambers G, parallel with the side walls thereof, said partition being composed of bolting-cloth, muslin, or other pervious material of suitable fineness to allow the fine dust or fuzz to pass through it and to retain the coarser particles.

The partitions I, one of which is shown separately in Fig. 7, consists of end pieces, $i$, and three transverse strips, $i'$, said strips being provided with apertures $i^2$ corresponding in position with the ends of the trunks F. The ends of the said trunks, which extend beyond the side walls of the casing B, fit closely against the strips $i'$, and are constructed to slide thereon, so as to permit the reciprocation of the said casing to which they are rigidly attached. By this construction, as is shown more clearly in Fig. 4, the dust drawn from the interior of the casing B, passes through the partition I to the outside thereof, and is then drawn back through the said partition to the space G', with which space the exhaust-inlet of the exhaust-fan communicates, the coarser particles in said dust being arrested by the said partition, while the finer dust or fuzz passes through it to the exhaust-fan, and is conveyed by the air-blast therefrom to a dust-room or elsewhere.

The coarser particles separated from the dust in the chamber G fall upon a transversely-inclined board, J, located near the bottom of said chamber, over the lower edge of which board they fall into a longitudinal trough or conveyer, $j$, having its bottom inclined from each end of the machine to a central discharge-spout, $j'$. The spout $j'$ is provided with an outwardly-opening flap-valve, $j^2$, for the purpose of preventing the entrance of air to the chamber G through said spout, said valve being constructed so as to open by the pressure of the material which accumulates behind it, in order to allow the exit of such material. The board J is placed a short distance above the inclined bottom $a^3$ of the chamber G, and at the junction of the said bottom with the side casing, $a$, is a narrow opening, $a^4$, extending the full length of the chamber G, through which opening air is admitted to the space between the inclined board and the bottom $a^3$, which air is drawn upward through the material as it falls from the lower end of the board J, and by lifting the lighter particles performs an additional separation of the fine dust from said material. A movable slide, $a^5$, is placed over the aperture $a^4$, for adjusting the width of the said opening, whereby the strength of the air-current passing through the material falling from the board J may be regulated as desired.

For the purpose of removing any large and light specks or impurities which have not been separated from the middlings by the upward blast through the screens, and which would otherwise pass with the tailings to the screen below, I subject the said tailings, as they fall from the lower end of one screen to the head of the next, to an upward blast of air, by which said specks are separated from the tailings and carried out of the machine. To produce this air-blast I have formed horizontal openings or slits E' in the outer walls of the passages E a short distance below the ends of the screens C and C', as shown. By the action of the exhaust-fan a current of air is drawn inwardly through the said slits, and passes upwardly through the tailings into the space above the screens and out through the trunks F, carrying with it the specks and impurities mentioned.

For the purpose of regulating the air-blast mentioned, the openings E' are provided with sliding valves $e$, which may be clamped in any desired position by means of thumb-nuts $e'$, placed on bolts which are secured in the walls of the casing and pass through slots in the said valves.

At the lower end of the passages E are placed downwardly-opening valves $e^2$, consisting of depending strips of rubber or other flexible substance, said valves being constructed to prevent the upward passage of air into the passage E, and to yield by the weight of the material, which accumulates above them, so as to allow such material to pass to the screen below.

In order to economize space in the casing B, and to permit the use of screens of greater length than otherwise could be placed in said casing, the passages E are formed in projecting portions $B^3$ upon the ends of the said casing, as shown in Fig. 3. The top of said projecting portion consists of an inclined hinged cover, $b^4$, which opens immediately over the lower end of the screen, so that the said screen and the adjacent parts may be inspected, and access readily had to them.

The frames of the several screens are of ordinary construction, and said screens are supported in the casing B at either side thereof by having their edges placed in a groove formed by two strips, $c$ and $c'$, attached to the side walls, $b$, as shown in Fig. 4. The heads of the several screens extend to the end walls, $b'$, of the casing, and the screens may be readily removed, for the purpose of repairs or renewal, by drawing them out through said end walls. A fastening device, $c^2$, is placed at the head of the screens, whereby they are held in place in the said grooves. The feeder $C^3$ is placed upon the top covering, $a'$, of the machine, and is constructed to deliver the material to be operated upon into a receptacle, $c^3$, placed in the casing B, over the head of the screen C. The receptacle $c^3$, as shown, has a narrow slit, $c^4$, in its bottom, through which the material is delivered to the screen, and which is provided with a depending flexible strip, $c^5$, arranged, as shown, so as to allow the downward passage of material through it, but to prevent the upward passage of air. This construction in the receptacle $c^3$, however, relates to the operation of the feeder shown, and has no operative relation to the middlings-purifier proper.

Beneath the lower screen, $C^2$, are placed two transversely-inclined surfaces, $D^2$, which are arranged to discharge the material passing through said screen to a central longitudinal trough, $D^3$, having an inclined bottom, $d^3$, which terminates at its lower end in a discharge-spout, $d^4$. The purified middlings passing from the partitions D and D' through the passages $d$ and $d'$ are discharged at the lower end of the said trough and pass out of the machine by the spout $d^4$. The material passing through the screen $C^2$ may pass out of the machine by the spout $d^4$ with the purified middlings from the screens C and C', or, if it is desired, may be delivered to a separate spout or exit, $d^5$, and form another grade of middlings called "seconds."

In order to effect such separation of the middlings, and at the same time to provide a means for sending the material passing through any desired portion of the screen to the spout $d^4$ and the remainder to the exit $d^5$, I have provided a peculiar construction in the spout $D^3$, as is shown more clearly in Fig. 3. Over the lower end of the inclined bottom $d^3$ of said spout is placed an oppositely-inclined partition, $d^6$, the lower end of which terminates over a valved aperture, $d^7$, in the said bottom, said aperture being placed immediately over the exit-aperture $d^5$. Below the upper end of the bottom $d^3$ and parallel to it is a second incline, $d^8$, which terminates at its lower end in the exit-aperture $d^5$. In the upper portion of the incline $d^3$ is placed a series of valved openings, $d^9$, and in the partition $d$ is a similar series of openings, $d^{10}$. By closing all the apertures mentioned the material passing into the trough $D^3$ is all conveyed to the spout $d^4$, as will be readily seen by the drawings, and by opening the aperture $d^7$ all such material will pass out of the exit-opening $d^5$. When one of the apertures $d^9$ is opened, all the material falling upon the incline $d^3$ above said aperture will be intercepted and pass to the incline $d^8$ and out of the machine through the exit $d^5$, and in the same manner the aperture $d^7$ being open, when one of the apertures $d^{10}$ is opened, the material falling upon said incline above said aperture will be delivered at the spout $d^4$, and that below to the exit $d^5$.

For the purpose of keeping the bolting-cloths in the several screens clear, rotary beaters are preferably used, which consist of rollers K, (shown more clearly in Fig. 8,) having small tags of leather attached thereto, which tags are thrown outward by centrifugal force as the rollers are moved across under the screens, so as to strike the surface of the cloth thereon, and clean it without injury thereto. The said rollers rest upon tracks or ways L′ and $L^3$ at their ends, and receive their rotary motion by rolling on said ways when moved back and forth beneath the screens. Such rotary beaters have been previously patented, and form in themselves no part of this invention. The ways L′ are placed outside of the casing B, and are supported upon cross-pieces $L^2$, attached to the frame of the machine, and the ends of the rollers K are extended outside of the said casing through the openings $b^3$, so as to rest on said ways. The opposite ends of the rollers are supported on a rod, $L^3$, secured at its ends in the frame A, as shown in Fig. 3. The said rod extends through the interior of the casing B, beneath the lower cross-piece of the screen-frame, the apertures in the sides of the casing through which it passes being enlarged, so as to allow for the vibrating movement of the casing.

One object in placing the ways L′ and $L^3$ as described is to prevent the middlings passing through the screens from falling upon them, and being crushed into flour by the beater-rollers.

It has been found in practice that the rotary beaters described, if arranged to pass under the longitudinal ribs by which the bolting-cloth is supported intermediately of its edges, are liable to cut or injure the cloth at its point of attachment to said ribs. In order to remedy this difficulty, one beater is placed beneath each section of the screen, and its movement is limited to the width of such section. In the drawings, the screens are shown as divided into two sections, and two beaters are used; but when one section of cloth alone is used, or more than two, a corresponding number of beaters is provided.

For the purpose of moving the beaters laterally to accomplish the cleaning of the bolting-cloths, as described, a lever, L, is pivoted upon the cross-piece $L^2$, one end of which extends outwardly from the end of the machine, and the other inwardly through the opening $b^3$, and is connected to a frame or carriage carrying the rollers K. Such carriage consists of two end pieces, $k$, to which the ends of the rollers are journaled, and two central longitudinal rods, $k'$, connecting said end pieces, as shown.

Upon the rods $k'$, near their center, is attached a block, $k^2$, provided with a slot, $k^3$, through which the inner end of the lever L passes. The block $k^2$ is clamped to the rods $k'$ by means of a plate, $k^4$, between which plate and the block $k^2$ the said rods are placed. The block $k^2$ and the plate $k^4$ are provided with corresponding semicircular grooves, in which the rods $k'$ fit, and are secured together by a bolt, as shown, or in any other convenient manner. By moving the block $k^2$ longitudinally upon the rods $k'$, the length of the inner arm of the lever L may be changed, and the amount of lateral movement given to the rollers varied thereby, as desired. The levers L are connected by means of rods $l$ to arms $m$ upon vertical rock-shafts M, journaled in brackets M′, placed at the corners of the frame A at one side of the machine. The said rock-shafts are provided with arms $m'$, placed at right angles to the arms $m$, and are connected by means of rods $m^2$ with a double crank-arm, N, pivoted centrally upon a short stationary shaft, $n$, attached to the outer casing, $a$, of the machine, and near the center of the side thereof.

Upon the shaft $n$ is also placed a sprocket-wheel, N′, which is actuated by means of a chain-belt $N^2$, from a sprocket-wheel, O, having bearings on the shaft $o$. A second sprocket-wheel, O′, is placed on the shaft $o$, which is driven from a chain-belt, $O^2$, from a counter-shaft, P, mounted upon the top of the frame of the machine.

Upon the hub of the sprocket-wheel O and adjacent to the face of the wheel O′ is a lever, $O^3$, having two equal and oppositely-arranged arms, the ends of which arms extend slightly beyond the peripheries of the wheels O and O′. The chain-belt $O^2$ has upon one of its links a laterally-projecting stop, $o'$, which is so placed that in its passage around the wheel O′ it will encounter one of the ends of the lever $O^3$, so as to give a half-revolution both to said lever and to the wheel O to which the said lever is attached. The wheel O thus receives a half-revolution at each passage of the stop $o'$ around the wheel O′, which movement is transmitted by means of the chain-belt $N^2$ to the wheel N′. The belt $N^2$ is provided with a stop, $n'$, which acts upon the ends of the lever N, so as to give to said lever a half-revolution on its axis in the manner before described in connection with the lever $O^3$. At each half-revolution of the lever N the rods $m^2$ are given a half-stroke, and such movement, by means of the devices before described, is transmitted to the beater-rollers K, which thus receive a reciprocatory movement at regular periods, first over one half of each section of the bolting-cloth and then over the opposite half. The frequency with which the lever N is revolved and the beaters K are moved may be increased by placing additional stops upon the belts $O^2$ and $N^2$ in an obvious manner. The frequency of the said movements of the beaters may be decreased by introducing one or more additional pairs of wheels similar to the wheels O and O′ between the driving-shaft and the wheel N′, or by placing the said wheels so that the lengths of the connecting-belts will be increased in a manner which will be rendered exhaust-fan, an inclined bottom to said settling-chamber, and an air-passage communicating with the said settling-chamber and constructed and arranged to cause an upward air-current through the material falling from the lower edge of said inclined bottom, substantially as described.

4. In a middlings-purifier, the combination, with the screen-casing and exhaust-fan, of an air-chamber, G, connected with the interior of the screen-casing and the exhaust-fan, and provided with an opening, $a^4$, near its bottom, and an inclined board, J, placed in the said chamber above said opening, substantially as and for the purpose set forth.

5. In a middlings-purifier, the combination, with the screen-casing, settling-chambers upon either side of said casing, and an exhaust-fan, of an air-trunk, F, extending through the interior of said casing above the screen communicating with the said chambers at its ends, and provided within the casing with a longitudinal opening extending practically the full width of the screen, substantially as described, and for the purposes set forth.

6. In a middlings-purifier, the combination, with the screen-casing, settling-chambers upon either side of said casing, vertical screens in said settling-chambers, and an exhaust-fan connected with the space between said vertical screens and the exterior of the screen-casing, of an air-trunk, F, communicating with the interior of the screen-casing, and with the space between said vertical screens and the outside walls of the settling-chambers, substantially as described.

7. In a middlings-purifier, the combination, with the screen-casing, a screen supported therein, and an exhaust-fan, of settling-chambers G, located at the sides of the said casing and connected by suitable passages with the said exhaust-fan, air-trunks F, communicating at their ends with the said settling-chambers, extending through the said screen-casing, and provided with longitudinally-extending openings $f$, communicating with the interior thereof, and valves $f'$ for controlling said openings $f$, substantially as and for the purpose set forth.

8. The combination, with the vibrating casing B, screens C, air-chamber G, and air-trunks F, of the stationary partition I, having sections $i$ of pervious material, and intermediate slats, $i'$, the latter provided with apertures $i^2$, arranged opposite the trunks F, substantially as and for the purpose set forth.

9. In a middlings-purifier, the combination of an inclined separating-screen, a casing therefor, an exhaust-fan connected with said casing above the screen, and a passage, E, extending downwardly from the lower end of said screen, and provided with an elongated aperture in its exterior wall below the screen, whereby an upward current of air is caused to pass through the tailings falling from the lower end of said screen, substantially as and for the purpose set forth.

10. In a middlings-purifier, the combination of an inclined separating-screen, a casing therefor, an exhaust-fan connected with said casing above the screen, a passage, E, extending downwardly from the lower end of said screen, and provided with an elongated opening in its exterior wall below the screen, and an adjustable valve constructed to regulate the inflow of air to the passage through said opening, substantially as and for the purpose set forth.

11. In a middlings-purifier, the combination, with two or more oppositely-inclined screens, a casing surrounding each of said screens, and an exhaust-fan communicating with the interior of said casing above the screens, of a passage, E, extending from the lower end of one screen to the head of the next, and a valve, $e^2$, at the lower end of said passage, for the purpose of preventing an upward flow of air therein, substantially as described.

12. In a middlings-purifier, the combination, with two or more oppositely-inclined screens, a casing surrounding each of said screens, and an exhaust-fan communicating with the interior of said casing above the screens, of a passage, E, extending from the lower end of one screen to the head of the next, and provided with a horizontally-extended opening in its exterior wall, and a downwardly-opening valve at its lower end, substantially as and for the purpose set forth.

13. The combination, with the inclined screen $C^2$, of a trough, $D^3$, constructed to receive the material passing through said screen, said trough having an inclined bottom, $d^3$, provided with apertures $d^7$ and $d^9$, an oppositely-inclined partition, $d^6$, having valved apertures $d^{10}$, and a secondary bottom, $d^8$, provided with an exit-opening, $d^5$, substantially as and for the purpose set forth.

14. The combination, with the carriage $k$, having longitudinal rods $k'$, the lever L, pivoted to the frame of the machine, and means for actuating said lever, of a block, $k^2$, secured to said rods and adjustable longitudinally thereon, and constructed to afford attachment for the end of said lever, substantially as and for the purpose set forth.

15. The combination, with a reciprocating beater-carriage, and with a lever, L, for actuating said carriage, of the rock-shaft M, having arms $m$ and $m'$, the pivoted lever N, connecting-rods $m^2$ and $l$, and means for intermittently revolving the said lever N, substantially as described.

16. The combination, with a reciprocating beater and with a suitable driving-pulley, of a sprocket-wheel, O, a sprocket-wheel, O', provided with arms $O^3$, a belt, $O^2$, provided with a stop, $o'$, a sprocket-wheel, N', a belt, $N^2$, provided with a stop, $n'$, a lever, N, and means for operating the said beater from said lever, substantially as described.

17. In a middlings-purifier, the combination, with the frame of the machine and with a vibratory screen-casing, B, of the settlingobvious by an inspection of Fig. 6. The casing B is supported from the lower cross-pieces at either end of the frame A by means of flexible standards Q, which are bolted at their lower ends to said cross-pieces, and at their upper ends to the corner frame-pieces B' of the casing B. A suitable vibrating motion is given to the casing B by means of eccentrics R, which are mounted on a shaft, R', placed in suitable bearings upon one end of the main frame, which eccentrics bear against opposing rollers S placed upon a cross-shaft, S', having bearings upon one end of the casing B. Motion is given to the eccentrics R by means of a driving-belt upon a pulley, R², placed upon one end of the shaft R'.

At the opposite end of the machine are springs T, which are placed between brackets T' upon the vertical posts of the frame A, and the frame B' of the casing B, so as to keep the rollers S in contact with the eccentrics R.

In order to prevent the slipping of the eccentrics R upon the rollers S, the bearing-edges of the latter are provided with a covering, s, of rubber or similar elastic material, which also acts as a cushion to lessen the jar on the adjoining parts as the casing is vibrated.

A horizontal spring-brace, U, (shown in Fig. 5,) may be attached at one end of the inner face of the vertical end post, A, with its opposite end secured near the opposite side of the end wall, b', of the casing B, so as to prevent any lateral movement or swaying of the upper part of said casing and consequent unequal pressure and friction on the sliding joint between the sides of the casing and the end pieces of the outer frame. The screens, the receiving-surfaces placed below said screens, and the several carrying-spouts and troughs mentioned, all being rigidly attached to the casing B, the oscillating motion imparted to said casing not only causes the said screens to effect the necessary separation of the material thereon, but serves to facilitate the passage of the material over the several receiving-surfaces and through the several troughs and passages described.

By the construction in the machine described, whereby a separation of the material carried from the middlings by the air-blast is effected in compartments placed in the frame of the machine on either side of the screen-casing, I am enabled to accomplish such separation without the use of a separate machine or apparatus, and without materially increasing the size or cost of the middlings-purifier proper.

The construction described also presents great advantages in point of simplicity and economy from the fact that by the location of the chambers G adjacent to the sides of the screen-casing the air can be drawn directly from the several compartments over the screens in such casing and into said chambers, and the use of a complicated system of air-passages for connecting said compartments with the exhaust-fan is thereby avoided.

I am aware that specks or other impurities have been separated from the tailings falling from the lower end of an inclined screen in middlings-purifiers by means of an air-current; but such air-current has heretofore either been caused to pass transversely through the tailings below the lower end of the screen directly into a passage leading to an exhaust-fan, or such current has been drawn from the chamber of the screen-casing below the screen upwardly and around the lower end of the screen and through the tailings falling therefrom into the chamber above the screen, where it joins the current which has passed through the screen, the air-current in the latter case being divided, so that a part of it passes through the tailings and a part through the screen. A construction similar to either of those above mentioned for producing an air-current through the tailings is therefore not embraced by my invention, but it is confined to the particular construction described, by which the air enters the exterior wall of a passage for the tailings, which leads downwardly from the lower end of the screen, said air-current passing upwardly through the tailings into the casing above the screen and out of the casing with the air-current which has passed through the screen. By this construction the air-inlets to the lower surface of the screen and to the tailings are formed at separate points in the screen-casing, and may be independently regulated, and an advantage is gained in simplicity and cheapness of construction by dispensing with separate passages communicating with the exhaust-fan for producing the two currents mentioned.

I claim as my invention—

1. In a middlings-purifier, the combination, with the frame of the machine, a vibrating screen-casing supported in said frame, and an exhaust-fan, of a settling-chamber located at the side of the frame adjacent to the casing, and having its inner wall formed by the side of the casing, and passages connecting the said settling-chamber with the interior of the casing and the exhaust-fan, substantially as and for the purpose set forth.

2. In a middlings-purifier, the combination, with the screen-casing and an exhaust-fan, of a settling-chamber, a partition of pervious material placed in said chamber, and passages connecting the said chamber with the interior of the screen casing and with the exhaust-fan, said passages being arranged to communicate with the settling-chamber at opposite sides of the said partition, substantially as and for the purpose set forth.

3. In a middlings-purifier, the combination, with the screen-casing and an exhaust-fan, of a settling-chamber for the separation of the coarser from the finer particles of dust by gravity, passages connecting such chamber with the interior of the screen-casing and with the chambers G, having their walls formed partially by the said casing B and partially by a stationary casing attached to said frame, said movable casing B and stationary casings having substantially air-tight joints at their lines of juncture, substantially as described.

18. In a middlings-purifier, the combination, with the movable inner casing, B, the settling-chamber G, and an exhaust-fan communicating with said chamber, of a longitudinal spout, $j$, attached to and movable with the casing B, constructed to receive the material falling on the bottom of said chamber, and provided with an outwardly-opening valve, $j^2$, substantially as and for the purpose set forth.

19. In a middlings-purifier, the combination, with the frame of the machine, the screen-casing B, and rotary beaters K, of tracks or ways, as $L'$ $L^3$, supported upon the frame of the machine outside of said casing, substantially as described.

In testimony that I claim the foregoing as my invention I affix my signature in presence of two witnesses.

JOHN T. WALTER.

Witnesses:
 FRANK REEDER,
 C. B. HETRIEN.